United States Patent [19]
Mills

[11] 3,738,737
[45] June 12, 1973

[54] ANTIGLARE SAFETY REARVIEW MIRROR FOR AUTOMOTIVE VEHICLES

[76] Inventor: John Edward Mills, 15142 Drake Road, Strongsville, Ohio 44136

[22] Filed: Oct. 7, 1971

[21] Appl. No.: 187,563

[52] U.S. Cl. .............................................. 350/278
[51] Int. Cl. ......................... B60r 1/04, G02b 5/08
[58] Field of Search ........................ 350/278-283

[56] References Cited
UNITED STATES PATENTS

| | | | |
|---|---|---|---|
| 1,768,354 | 6/1930 | Falge | 350/283 |
| 1,805,969 | 5/1931 | Bostrom | 350/278 X |
| 1,781,999 | 11/1930 | Bittinger | 350/280 |
| 2,881,655 | 4/1959 | Eisenschink | 350/278 X |

Primary Examiner—John K. Corbin
Attorney—Philip D. Golrick

[57] ABSTRACT

In a day and night rearview mirror system for an automotive vehicle, whether an otherwise conventional inside or outside mirror or a periscope system, on a mirror over its horizontal extent and horizontally parallel to road as viewed in the image display, there is provided a middle band of reflectivity reduced to a degree that, for following headlights imaged to the driver in the band, the glare is diminished to a level which is not interfering to a safe driving night vision nor annoying to the driver; a sufficient width or vertical dimension of the band enabling the driver easily to bring imaged following headlights into, and with changing inter-vehicle spacing keep them within, the reduced reflectivity area by a slight head tilting.

11 Claims, 5 Drawing Figures

PATENTED JUN 12 1973 3,738,737
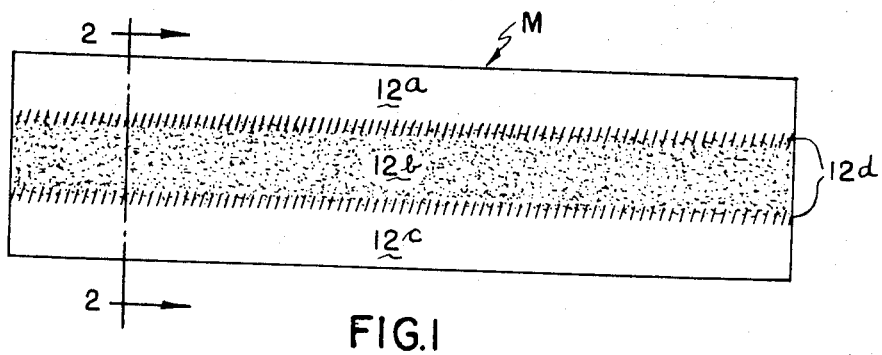
FIG.1
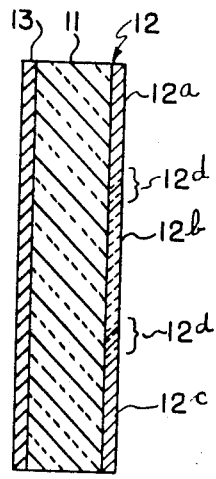 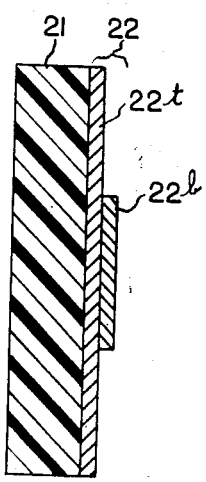 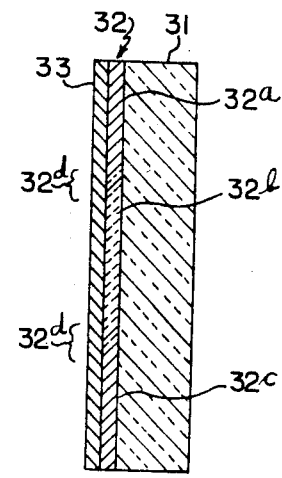
FIG.2  FIG.3  FIG.4
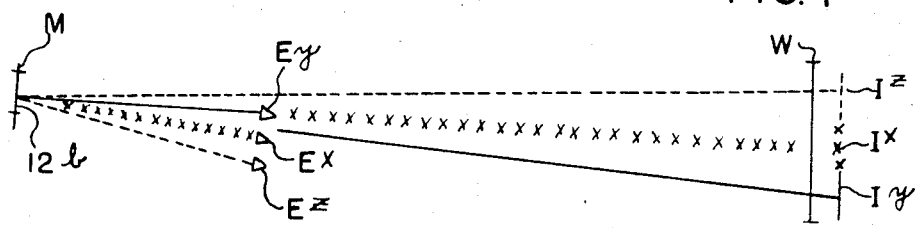
FIG.5
INVENTOR.
BY JOHN E. MILLS
ATTORNEYS

ANTIGLARE SAFETY REARVIEW MIRROR FOR AUTOMOTIVE VEHICLES

The attention given by the various standard-setting authorities or bodies to indirect visibility systems including rearview mirrors in automotive vehicles, and statistical studies indicating that over one-fifth of all motor vehicle crashes to the extent of about "some 6 million crashes per year occur in the indirect field of view area to the sides and rear," are themselves evidence of the importance of rear vision through rearview mirrors.

The problems presented to the driver, during nighttime driving of an automotive vehicle, by headlight glare reflected in an inside or outside (so-called "side-view") rearview mirror from a vehicle or vehicles to the rear, are well known to any experienced driver. Where the rearview mirror is set to the normal disposition or angle to which the driver is generally accustomed for optimum rearview or rear field imaging in daytime driving and with his normal posture, headlights of a following vehicle, whether at a distance more or less fixed or varying as the rearward vehicle is dropping back after having been passed or is overtaking for passing, quite frequently present such high intensity light or glare reflected at the driver's eyes, that even his forward vision is greatly interfered with, not to speak of the interference with vision when the driver is looking directly at the mirror to observe the rearward field image therein.

The dangers arising from the described interferences with forward vision of the path over which the car is being driven or with vision of the field to the rear are obvious both as immediate causative factors in the development of critical situations for drivers and as impairing to some degree ability to handle a critical situation otherwise initiated.

Further a continuing reflection of headlights into a driver's eyes is at least annoying, especially where the vehicles are maintaining a normally safe spacing for some comparatively long period, and this of itself may become an unsafe driving situation either in contributing to the overall difficulties of night driving by driver fatigue, or indirectly to the extent that, to eliminate the immediate glare problem the driver may either turn the mirror out of its normal position thus to a degree rendering the mirror non-functional or, alternatively, he may be ducking his head sideways or grossly shifting his body from normal either to a position or posture which is more tiring or which renders him less able to respond quickly and well in his movements for vehicle operation, or to a position or posture where his eyes are out of a position allowing ready use of either the glare-reflecting mirror, or even of both mirrors where an inside and an outside or so-called "side-view" mirror are present on the vehicle as is now standard for new passenger vehicles in the United States.

Concern about the above stated problems is evident even in the patented prior art proposals of various rearview mirrors intended to minimize following headlight glare; such, for example as the use of a reflecting silver layer applied to a somewhat finely roughened surface, expected to diffuse to some degree the glaring incident light; or use of an otherwise conventional reflecting silver surface in which many like relatively narrow parallel unsilvered areas or stripes of uniform width extend over the full horizontal length of the mirror, dividing the mirror surface into silvered stripes of uniform larger width, with the unsilvered stripes having a width say one-third of the reflective stripes so that one-fourth the total mirror area is unsilvered thereby to reduce the overall reflectivity of the mirror, but not reducing the intensity of the light actually reflected from the numerous and relatively closely spaced silvered areas.

Further there has been proposed the use of materials in or as coatings or screens, such as variable density filters, over a mirror surface which by molecular or other sub-microscopic rearrangements change their light transmission characteristics, and hence the net mirror unit apparent reflective characteristics, in response to the intensity of incident light.

There have been other quite different approaches to the problem, represented, for example, by proposals for a mirror unit, usually prismatic, mechanically tilted to displace a full-silvered surface used as a daytime mirror, and bring into position as a night mirror an unsilvered surface having the reflectivity of a plain glass surface generally approximately a 4 percent reflectivity; or for mechanical introduction of a light filtering screen either in the path of the incident or reflected light, either automatically under control of photocell devices sensing light intensity or in response to a specific driver actuated control.

Such prior art approaches to the problem have had certain deficiencies, such as lack of clarity or definition of the image of the rearward field; or in the fact that, despite a reduction in overall reflectivity of the mirror, nonetheless the glare problem as a practical matter was not abated; or in diminishing the effectiveness of the mirror for daytime or even nighttime driving use at times when following headlights were not present or so located or used that glare would not be present. In devices where an entire mirror area for night driving has a very marked reduction in reflectivity, either in the surface itself or by virtue of interposed means attenuating incident or reflected light, or both, a particular disadvantage is a diminution of depth perception for the driver. In other prior proposals complexity of structure of use and maintenance, or cost of production represent decided disadvantages.

By the present invention, even in an otherwise conventional mirror there is provided, in the preferred form on a front silvered mirror, a single central band extending transversally across the mirror as it is in use; which band has a reduced reflectivity as compared with adjacent say normally reflecting areas, and of which the width, that is, vertical dimension, constitutes a sizable fraction of the total imaging mirror area such that by slight head tilting without gross bodily movements, the driver easily may as it were "capture" and maintain following headlights in such band. With the headlights imaged in the area of reduced reflectivity the glare problem is thereby abated, while yet providing useful reflectivity in the band as well as normally reflective areas outside the band.

As hereinafter appears from the description of the particular embodiments, a mirror embodying the present invention, effective for the desired purposes, is yet quite simple in form, readily produced for inside or outside rearview mirrors, whether in the more generally used form of a plane mirror, or in a convex mirror of either a cylindrical or spherical curvature, and also for use in a periscopic type system. The desired result of glare reduction is thus readily attained at low cost without need of sophisticated mechanisms or mirror unit structure for a change of the net reflecting properties for the imaged field, either by mechanical tilting, screening or by varying the reflectivity of the actual imaging surface or transmissibility in variable density filters through light intensity responsive properties of components in the mirror structure or system.

Though description of a particular embodiment and general discussion of the invention may be in terms of a simple planar mirror or of an inside mirror, it is to be understood that the invention has application to inside and outside mirrors, also to curved mirrors and to mirrors in a periscopic system, for providing day and night rearview vision, especially to the driver in an automotive vehicle.

It is then the general object of the present invention to provide a simple and improved safety type day-night rearview mirror for automotive vehicles.

Another object of the present invention is to provide a safety rearview mirror for automotive vehicles affording in use means for eliminating or reducing the rearview vision interference and annoyance to the driver usually arising from the reflection of following vehicle headlights in conventional mirrors.

It is another object of the present invention to provide a safety rearview mirror for automotive vehicles which provides, across the rearward field-imaging area, a band of reduced reflectivity into which imaged headlights of a following vehicle may be brought easily merely by slight head tilting motion of the driver, in the normal vehicle environment with conventional mirror mounting.

Another object is the provision of an improved motor vehicle rearview mirror of relatively low cost.

Other objects and advantages of the present invention will appear from the following description and drawings wherein:

FIG. 1 is an elevational view of one form of rearview mirror embodying the present invention with certain schematic designations appearing thereon;

FIG. 2 is a somewhat enlarged sectional view, taken as indicated by the line 2—2 in FIG. 1; but with exaggeration of thickness of certain layered structures;

FIG. 3 is a view similar to FIG. 2 representing modification of the preferred form of the invention;

FIG. 4 is a view again similar to FIG. 2 showing a further embodiment of the invention;

FIG. 5 is a diagram, presented neither as optically geometrically nor dimensionally accurate but merely indicating the mode of use of the improved mirror in a passenger motor vehicle environment.

A preferred embodiment of the invention is represented by FIGS. 1 and 2 of the drawings. In FIG. 1, the rearview mirror, as a whole designated M, is shown as having a conventional horizontally elongated rectangular shape quite generally used in automotive vehicle inside rearview mirrors, but with symbolic or schematic representation used for certain features not otherwise readily represented.

Mounting means allowing tilting and horizontal pivoting of the mirror to an adjusted position in the vehicle convenient to the driver, for which conventional structures are known, are not shown in FIG. 1, where the mirror is simply shown disposed as in normal use with its length extending more or less horizontally or generally transverse of the vehicle.

In the somewhat enlarged sectional view of FIG. 2, thicknesses both of the substrate as well as of front or back surface coatings or layer structure are greatly exaggerated for clarity of representation.

Thus though the mirror shown in FIG. 1 might have a width, i.e., height, say of 2½ inches, and a length or horizontal dimension say of 12 inches, with a thickness perhaps on the order of one-eighth to one-fourth of an inch, reflective absorption or filtering layers or protective coatings would have thicknesses on the order of perhaps no greater than a few thousands of an inch with considerable differences even as between the thinner layers, so that, in the drawing, sections such as that of FIG. 2 are in no respect proportional in dimensions of components appearing within the section, much less relative to FIG. 1. It is likewise here noted that in FIG. 5, hereinafter discussed, in no sense is there any scaled or properly proportional representation of elements there appearing nor geometrical correctness of light paths, sizes of angles of incidence and reflection and the like, the figure being intended merely to aid description of a mode of use and operation.

For its gross general shape the mirror M may have a plane form as more common for inside and outside rearview mirrors, or for mirrors in periscopes; or it may be convex, either having curvature only horizontally, as a portion of a cylindrical curface whether circularly cylindrical or otherwise, or having bi-directional curvature, vertically and horizontally, as for example a portion of a spherical surface.

Whether the form be planar or convex, in the preferred form of the invention, the mirror M comprises a substrate or support body 11 which is "front silvered" at layer 12; that is, the incident light does not pass through the support to reach the reflective surface providing the rearview field imaging area, though it is to be understood that a coating for protective or other purposes might be applied, even over the effectively reflective front silvered layer, which coating obviously would be actually first encountered and traversed by incident light.

Moreover, the expression "front silvered," unless context demands otherwise, is to be understood as a designation of position or structure rather than composition, hence as comprising as well as silver other reflective coatings which may be applied to the "front" of the structure.

The substrate 11 has in addition to the front silvered surface 12, so designated as a whole, also a light absorptive back coating 13, such as black paint, where the substrate is glass, as here represented and as commonly used, or other transparent material.

Across the central region of the front surface 12 which defines the imaging area afforded to the driver by the mirror, in the particular form here shown, there is a strip-like zone or band 12b of an even width, as hereinafter described, running the entire horizontal extent or length of the mirror as a region of reduced reflectivity as compared with the "normal" reflectivity of the rest of the reflective surface 12 represented by the upper and lower bands 12a and 12c.

The reduced reflectivity may be provided, for example, by producing 12b as a semi-silvered coating as contrasted with a full silvered coating in 12a and 12c. Here "semi-silvered" is to be understood as meaning in the first instance merely a coating of diminished thickness or density allowing a notable portion of the incident light to pass therethrough rather than being thereby immediately reflected.

The back coating 13 is used to render the back surface substantially light absorptive and thereby at the back surface of 11 to diminish reflection of the light passing through the semi-silvered band 12b. However, if the substrate itself provides sufficient light absorption or a substantially diminished reflectivity at the interface between the back of 12b and the front of the substrate 11, the coating 13 is unneeded.

Further by a preferred aspect of the invention, as symbolized in FIG. 1, by the horizontal parallel series of short oblique lines 12d—12d, the longitudinal margins of the band 12b merge into the adjacent longitudinal normal reflective areas 12a, 12c; that is, each boundary rather than being a sharp discontinuity is actually diffused by virtue of a gradually increasing heaviness or density of the reflective material. This structural feature is an advantageous point of psychological design relative to eye response to the image field especially since there is no sharp line evident to attract the eyes to or initially rivet vision on the boundary region.

With the middle band 12b of reduced reflectivity running straight over the length of the mirror, thus to be horizontal in the normal use adjustment of the mirror in the vehicle, the middle band thus will be horizontally parallel to a road surface as viewed in the mirror; which is also the criterion applicable for incorporation of the invention in convex mirrors, leading there to a shape of the band drooping downward to each side from the longitudinal center of the convex mirrors.

In the modification shown in FIG. 3, on the front of the substrate 21, an image area defining coating, as a whole designated 22, comprises a "normally" reflective uniformly front silvered surface 22t over the entire area; and a band corresponding to 12b of FIGS. 1 and 2 is provided here by a further light absorptive layer 22b applied on the central region of 22t, thereby to provide for a decreased reflectivity or attenuation of light such as that produced by the incandescent lamps of headlights. The layer 22b comprises a colored transparent substance and may comprise a tape appropriately dyed to provide for light absorption to the required degree. Or the band 22b may, for example, be a coating sprayed by appropriate methods known to the such arts, in which case further the margins thereof may be thinned out or "feather-edged" to provide the same effect as in the diffuse margins 12d described relative to FIG. 2.

The substrate 21 considered as a whole may itself be a light adsorptive material, substantially transparent, or again may be glass with a back coating such as represented by 13 on 11 in FIG. 2.

In FIG. 4, the invention is shown embodied in a back-silvered mirror, wherein the substrate 31 is of course a transparent material, as glass, and the back silvered layer 32 has the structure of and may be formed after the fashion as described for the front silvered layer 12 of FIG. 2, to provide a horizontal cental band 32b, semi-silvered and therefore having reduced reflectivity, between the horizontally co-extensive upper and lower normally reflective bands 32a and 32c, with preferably again diffused margins 32d or transition areas of changing reflectivity between 32b and the adjacent margins of 32a and 32c. In this case a protective and light absorptive coating 33 is applied at the back on the back silver layer 32.

In the reduced reflectivity band of the aforementioned mirror forms (the band 12b or analogous bands in other figures), the reflectivity is from about 4 percent to about 20 percent of the incident light, and in the areas 12a and 12c, here for convenience termed "full silvered" areas, the reflectivity is from about 40 percent to about 95 percent of the incident light from sources as auto headlights.

For the average full size passenger vehicle, therefor for the driver head heights and eye spacings from the mirror placements used therein for inside and outside mirrors, the margin bands 12d—12d have a minimum practical width of one-eighth inch, about three-sixteenths inch preferred; and while for band 12b a minimum width of three-eighths inch may for some situations have some utility, a 9/16 inch width is preferred minimum for inside mirror use; and for outside mirror use, a ⅝ inch to ¾ inch minimum width; the bands 12d of ⅛ inch width being present additionally to the band 12b in such cases. For mirrors mounted higher above the road, therefore higher above usual headlight elevations, as outside mirrors on trucks, an increased minimum nine-sixteenths of about nine-sixteenth inch is indicated. Ordinarily, increasing the width to greater than 1 inch is of little value, and needlessly reduces the higher reflective areas. Thus on a slim inside miror 2½ inches wide, the zone 12b would occupy from about 20 to 40 percent of the mirror width.

The mirror is disposed in the location usual for its mirror type in an automotive vehicle with a conventional mounting sufficient. For example, as an inside mirror in a passenger vehicle the mirror is mounted forward of, and at or slightly above eye level for, the normal or average driver. Usually then the designed mirror size and location are such that with the mirror set for the driver's normal posture in driving, the mirror as a whole will image substantially the entire vertical and horizontal extent of the vehicle rear window. The band 12b then will be imaging the central transverse portion of the rearward field defined by the rear window; or as the driver views it, the band 12b appears to be imaged on or projected upon the middle of the rearward vision field or centrally across the rear window; occupying a substantial fraction of the vertical extent of the field of view.

In the purely schematic and generalized FIG. 5, as in a vehicle environment of use, the left vertical line M represents the mirror reflective surface; the vertical line W, the vertical extent or projection of the vehicle rear window; and the subscripted symbol E, the driver's eye at slightly different vertical positions. With mirror M set by vertical tilt adjustment for the driver's normal driving posture and head position as indicated by the central symbol E$x$ to have the band 12b appear, as it were, projected across or imaged (as represented by the $x$ symbol at I$x$) in the central region of the rear window, (the mirror of course also set in horizontal sense to span the window transversely), only a slight upward inclination of the driver's head, bringing the eyes to position E$y$ shifts the transverse image of the band 12b to appear at the lower portion of the window as indicated by the straight line at I$y$; while with similar slight shift downward to the eye position E$z$, the band appears to be imaged at the upper portion of the rear window as indicated the dashed straight line I$z$, also to the right of line W. Also in night conditions, the driver can set his mirror to the usual preferred disposition with the rearward horizon approximately on the center of the band 12b in the image display and this maintains the majority of encountered rearward headlights imaged in the reduced reflectivity band.

Considering the situation conversely in terms of incident light from rearward headlights, obviously if the light is entering the window along a path corresponding to the line of projection or imaging of the band 12b for a given eye position, it will be reflected to the driver's eye from the mirror band 12b and hence will be attenuated or reduced in intensity to obviate the glare. If by changing vertical road levels or angles or by changing intervehicle spacing, the path of the incident light, (that is, its angle of incidence) changes, only a very slight tilting head shift is required to keep the following lights in the band of reduced reflectivity from the driver's eye view point.

For an example of use by a driver in a typical environment, a flat mirror M (12 inches long and 2½ inches wide with a band 12b of about 9/16 inch width, and additionally margin bands 12d—12d each three-sixteenths inch wide, and representing an embodiment as above described for FIGS. 1-2) was merely secured to the original equipment mirror mounting in a four door sedan, where the distance from the mirror M to the top edge of a sloping rear window was about 63 inches, with projected vertical span of the windows as at W in FIG. 5 about 11 inches for an actual slope dimension of 20½ inches. By rough measurements, with a driver in his normal posture and the mirror being slightly (about 1 inch) above eye level, the mirror-to-eye (mid-eyes to mid-mirror) distance was about 27 inches; a darkened stripe representing the projection of the band 12b (lx in FIG. 5) and some part of the margins 12d—12d occupied roughly the middle third of the apparent rear window image; and could be shifted to a bottommost position as at ly by an upward head tilt represetting about 1¼ inch eye shift; and to a topmost position as at lz by a downward tilt representing again about 1¼ inch eye shift. In other words, shift from a bottom to a top position occured by a total tilting excursion of the eye of only 2½ inches, in a situation where the band 12d of 9/16 inch width at 27 inches subtended vertically an eye angle of about 1.3°. For a 20½ inch spacing, a dark band occupying the middle half was shifted to top and bottom positions by respective ¾ inch head tilts or only 1½ inch total excursion. The measurements having been rough, no attempt is made to reconcile the results at the two spacings or the physical geometry.

It has been found by actual experience of average passenger vehicle drivers, with a mirror as described in that example installed at the place of a conventional original equipment plane mirror, that after only a fraction of an hour of night driving on thruways and the like, the slight head tilting under differing circumstances to capture troublesome headlights in the attenuating zone or band became practically automatic without thought, as a quickly acquired habit; the driver, while attending to his forward driving vision, automatically and readily tilting his head slightly as needed to maintain the "capture" of the following headlights in the band 12b, even with changing vehicle spacing as in being overtaken by the following vehicle. The diffused margins 12d—12d, on the order of one-eighth inch wide, eliminated any untoward effects which would arise by sharp discontinuity between the attenuating zone and the fully silvered areas.

It was further found by actual trial, with reduction of reflectivity to the percentage above indicated in a front silvered mirror as described for FIGS. 1 and 2, that in the zone represented by band 12b sufficient vision was maintained of the following vehicle for safe observation, while yet the glare problem was obviated; while further above and below that the band or zone, e.g., where the same is at mid-height of the imaged field, clear vision and contrast was available. On the other hand, for daytime driving again effective rear vision is afforded in the total mirror arrangement. For day and for night driving, depth perception was provided. Though an intermediate reflectivity can also be used in the lower band at 12c in FIG. 1, this has not been found necessary as a practical matter for a mirror of conventional size for passenger vehicle use.

I claim:

1. For an automotive vehicle, a safety day and night driving rearview mirror providing as mounted functionally in a normal vehicle environment, a reflective imaging area for the driver and having a horizontal extent and a vertical extent and comprising:

in said imaging area, a band over said horizontal extent having reflectivity reduced to a degree that, from following vehicle headlights imaged on the said band, glare is dimished to a level non-interfering with safe night driving vision of a driver;

said band extending across the functional horizontal extent of said imaging area above and adjacent a portion of said imaging area having markedly higher reflectivity;

said band and portion merging into each other in a margin region gradually increasing from the low reflectivity of said band to the higher reflectivity of said portion;

said band having a vertical dimension sufficient to enable the driver easily to maintain the image of following headlights within said band by slight tilting of the head, even with changing inter-vehicle spacing.

2. A safety rearview mirror as described in claim 1, wherein:

said imaging area is horizontally elongated and planar and includes areas of higher reflectivity both above and below and horizontally co-extensive with said band.

3. A safety rearview mirror as described in claim 2, wherein:

both the upper and lower margins of said band merge through regions of increasing reflectivity into said areas of higher reflectivity.

4. A safety rearview mirror as described in claim 1, wherein:

said reflective imaging area is provided as a front silvered surface on a substrate conventionally mountable in a vehicle environment.

5. A safety rearview mirror as described in claim 4, wherein:

said band is provided as a semi-silvered portion of said front silvered surface.

6. A safety rearview mirror as described in claim 1, wherein:

a layer of light filtering or absorbant material is applied in a band over an imaging area of uniform reflectivity to provide a said band of reduced reflectivity whereby said glare is diminished to a level non-interfering with safe night driving vision of an average driver.

7. A safety rearview mirror as described in claim 1, wherein:
    said reflective imaging area is provided as a front silvered surface on a glass substrate having on its back surface a light absorptive layer;
    said band is provided as a semi-silvered portion of said front silvered surface between upper and lower more fully silvered areas of high reflectivity;
    both horizontal margins of said band merge through regions of increasing density and reflectivity into said areas of higher reflectivity.

8. A safety rearview mirror as described in claim 7, wherein:
    said band of diminished reflectivity has a vertical dimension greater than about three-eighths inch.

9. A safety rearview mirror as described in claim 1, wherein:
    said imaging area includes areas of higher reflectivity above and below and horizontally co-extensive with said band; and
    said band is shaped over its horizontal extent to appear horizontally parallel to a road surface as viewed by the driver in said mirror.

10. A safety rearview mirror as described in claim 1, wherein:
    in said vehicle at a distance from a vehicle design-contemplated average position of a driver's eyes, the said band in vertical extent subtends an angle of about 1.3° in a vertical plane extending from said position to said mirror.

11. For an automotive vehicle, a safety day and night driving rearview mirror providing, as mounted functionally in a normal vehicle environment, a reflective imaging area for the driver and having a horizontal extent and a vertical extent and comprising:
    in said imaging area, a band running over said horizontal extent, having reflectivity reduced to a degree that, from following vehicle headlights imaged on the said band, glare is diminished to a level non-interfering with safe night driving vision of a driver;
    said band extending across the functional horizontal extent of said imaging area between upper and lower portions of said imaging area each having reflectivity markedly higher than said band;
    said band and each said portion merging into each other through a respective margin region having reflectivity gradually increasing from the low reflectivity of said band to the higher reflectivity of the respective said portion;
    said band having a vertical dimension sufficient to enable the driver easily to maintain the image of following headlights within said band by slight tilting of the head, even with changing inter-vehicle spacing.

* * * * *